May 22, 1928. 1,670,560

I. C. WOODWARD

WHEEL PULLER

Filed Oct. 10, 1927

Witnesses
Arthur M. Framke.
Wm. E. Anderson.

Inventor:
Irving C. Woodward,
By Rummler & Rummler,
Attys.

Patented May 22, 1928.

1,670,560

UNITED STATES PATENT OFFICE.

IRVING C. WOODWARD, OF SYRACUSE, NEW YORK.

WHEEL PULLER.

Application filed October 10, 1927. Serial No. 225,386.

The main objects of this invention are to provide an improved form of wheel puller; to provide a wheel puller having an improved form of adapter for attachment to a wheel hub; to provide an adapter of this kind which will permit a single wheel puller to be used on a large number of hubs of different sizes; to provide improved means for securing the adapter to the cap of the wheel puller so as to permit a limited relative movement of the cap and adapter; and to provide a wheel puller of this kind which is particularly adapted for use in removing automobile wheels.

An illustrative embodiment of this invention is shown in the accompanying drawing, wherein:—

Figure 1:
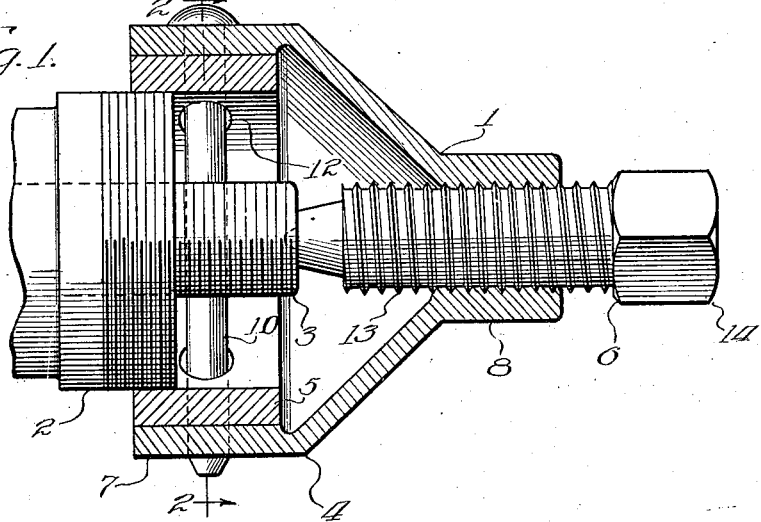
Fig. 1 is a longitudinal section of a wheel puller to which this invention is applied, part of a wheel hub and axle being shown in elevation.
Figure 2:
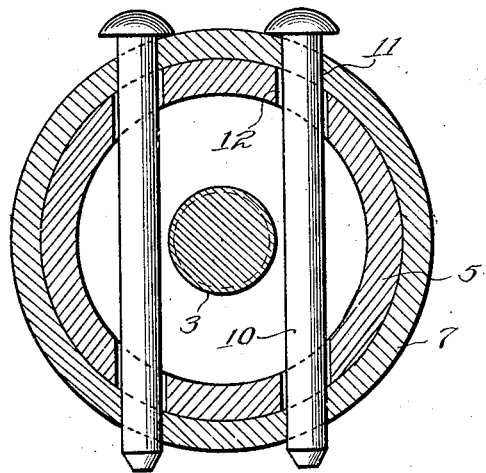
Fig. 2 is a transverse section, taken on the line 2—2 of Fig. 1.
Figure 3:
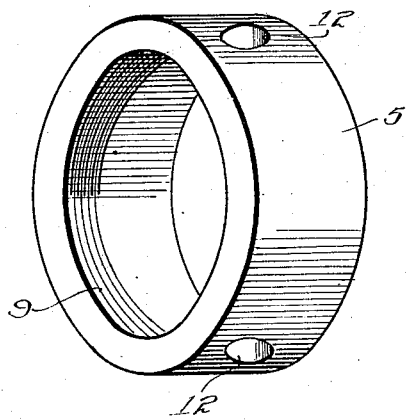
Fig. 3 is a perspective of the adapter.

In the construction shown, an improved wheel puller 1 is applied to a wheel having an externally threaded hub 2 mounted on an axle 3.

In the form shown, the improved wheel puller 1 comprises a shell or cap 4, having an adapter 5 arranged in one end thereof for attachment to the hub 2 and a ram 6 arranged in the other end for engagement with the extremity of the wheel axle 3.

The cap 4 may be made of cast or wrought metal and may be formed in any desired shape. As shown in the drawing, the cap 4 has a bell 7 at one end thereof which is of sufficient diameter to receive the adapters 5. The other end of the cap 4 is reduced to form a prismatic head 8 adapted to be gripped by a wrench, not shown, whereby the cap is rotated in its application to and removal from the wheel hub 2.

In the form shown, each of the adapters 5 comprises an annular member of a size which will permit it to fit within the cap bell 7. The inside diameters of the adapters vary, depending upon the size of the wheel hub for which it is made. Adapters which are to be applied to wheel hubs having external threads are internally threaded as shown at 9. The adapters 5 may be provided with any other suitable means for removably securing them to wheel hubs which are not threaded.

In removing wheels from axle shafts either a pull on the hub or a shock to the axle shaft is usually used, but the combined simultaneous action of a pull and a shock is many times as effective as either one alone. In order that the application of sudden shocks to the axle may be effective, improved means is provided for securing the adapter to the cap in a manner which will permit a limited relative axial movement of the cap and adapter.

In the form shown, the fastening means for removably securing the adapter to the cap comprises a pair of pins 10, which extend transversely through alined apertures 11 and 12 formed in the bell 7 and adapter 5 respectively. The apertures or slots 12 are larger in diameter than the pins 10 so as to permit a limited relative axial movement of the cap and adapter when the head of the screw is given shocks with a hammer or other means. In the arrangement shown, the pins 10 are disposed in substantially parallel spaced relation on respectively opposite sides of the axis of the cap, so as to clear the axle 3. If desired, the pins 10 may be made in the form of a U-bolt.

In the embodiment illustrated, the ram 6 comprises a screw having a shank 13, which is threaded in the cap head 8, and a prismatic head 14 for engagement with the wrench.

In operation, an adapter of the desired size is placed in the cap 4 and the device is then applied to the wheel hub 2. The screw 13 is turned up against the extremity of the axle 3 and held there with a wrench or other suitable tool while the head 14 is struck repeated blows.

Although but one specific embodiment of this invention has been herein shown and described, it will be understood that numerous details of the construction shown may be altered or omitted without departing from the spirit of this invention as defined by the following claims.

I claim:

1. A wheel puller comprising a support, a pin mounted on said support, an adapter secured to said pin, said support and adapter being capable of a limited relative movement axially, means for securing said adapter to a wheel hub, and ramming means on said support for engaging the extremity of the wheel axle.

2. A wheel puller comprising a support, a pin removably mounted on said support, an adapter secured to said pin, said support and adapter being capable of a limited relative movement axially, means for securing said adapter to a wheel hub, and ramming means on said support for engaging the extremity of the wheel axle.

3. A wheel puller comprising a support, a pin mounted on said support, an adapter removably secured to said pin, said support and adapter being capable of a limited relative movement axially, means for securing said adapter to a wheel hub, and ramming means on said support for engaging the extremity of the wheel axle.

4. A wheel puller comprising a support, an adapter arranged within said support, a pin and slot connection arranged to secure said adapter to said support so as to permit a limited relative axial movement of said support and adapter, means for securing said adapter to a wheel hub, and ramming means on said support for engaging the extremity of the wheel axle.

5. A wheel puller comprising a support, an adapter arranged within said support, a pin and slot connection arranged to removably secure said adapter to said support so as to permit a limited relative axial movement of said support and adapter, means for securing said adapter to a wheel hub, and ramming means on said support for engaging the extremity of the wheel axle.

6. A wheel puller comprising a support, an adapter arranged within said support and having a slot therein, a pin mounted on said support and engaging said slot, said slot being arranged to permit a limited relative axial movement of said support and adapter, means for securing said adapter to a wheel hub, and ramming means on said support for engaging the extremity of the wheel axle.

7. A wheel puller comprising a supporting cap, an adapter concentrically arranged within said support, a pin and slot connection arranged to secure said adapter to said cap so as to permit a limited relative axial movement of said adapter and cap, means for securing said adapter to a wheel hub, and ramming means on said support for engaging the extremity of the wheel axle.

8. A wheel puller comprising a supporting cap, an adapter concentrically arranged within said support, a pin and slot connection arranged to removably secure said adapter to said cap so as to permit a limited relative axial movement of said adapter and cap, means for securing said adapter to a wheel hub, and ramming means on said support for engaging the extremity of the wheel axle.

9. A wheel puller comprising a supporting cap, an adapter concentrically arranged within said support, a pin and slot connection arranged to removably secure said adapter to said cap so as to permit a limited relative axial movement of said adapter and cap, means for securing said adapter to a wheel hub, and ramming means mounted on said support and projecting into said adapter for engaging the extremity of the wheel axle.

10. A wheel puller comprising a cap, a pair of pins extending through said cap and disposed in substantially parallel spaced relation on respectively opposite sides of the axis of the cap, an adapter arranged within said cap and slotted to engage said pins, said adapter and cap being capable of a limited relative axial movement, means for securing said adapter to a wheel hub, and ramming means mounted on said support and projecting into said adapter between said pins for engaging the wheel axle.

Signed at Chicago this 6th day of October, 1927.

IRVING C. WOODWARD.